Nov. 29, 1949     L. L. ROE     2,489,818
WATER CARRIER FOR MINNOWS
Filed April 22, 1946     2 Sheets-Sheet 1
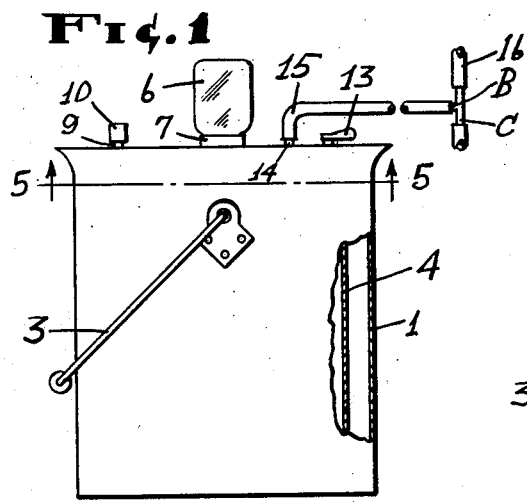
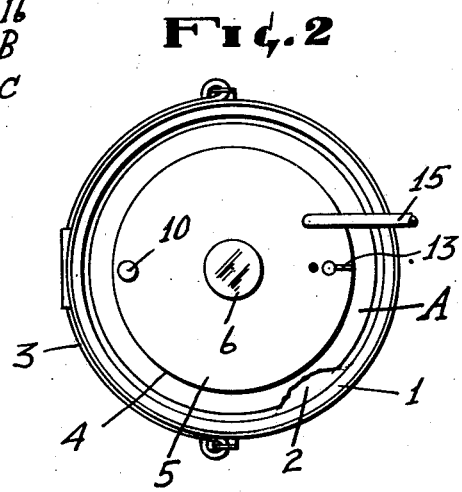
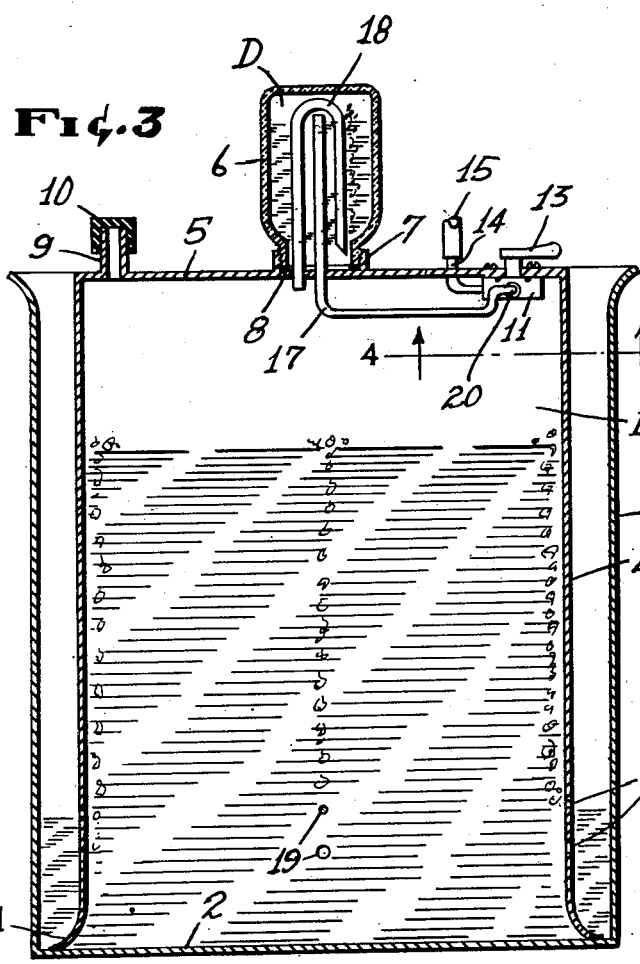
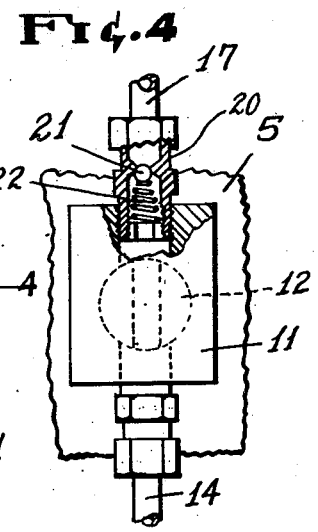
INVENTOR.
Louis L. Roe
BY

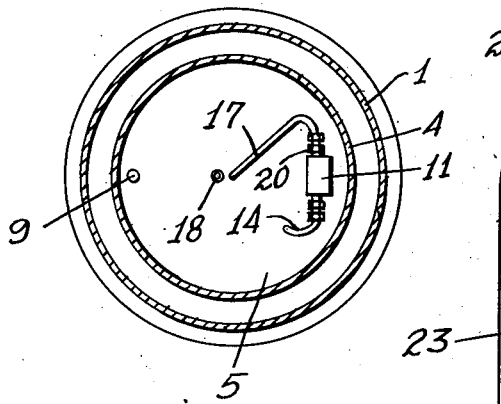
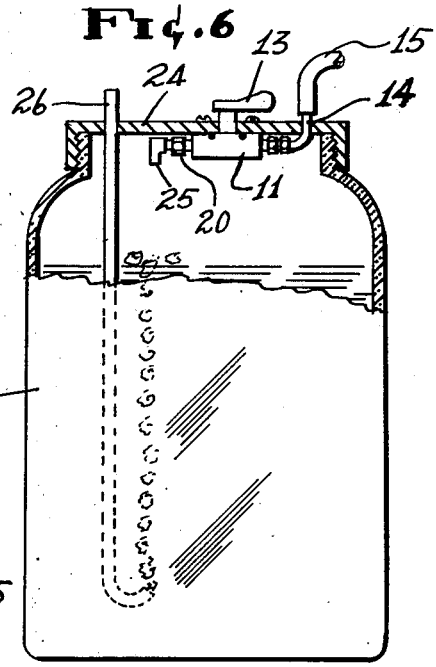
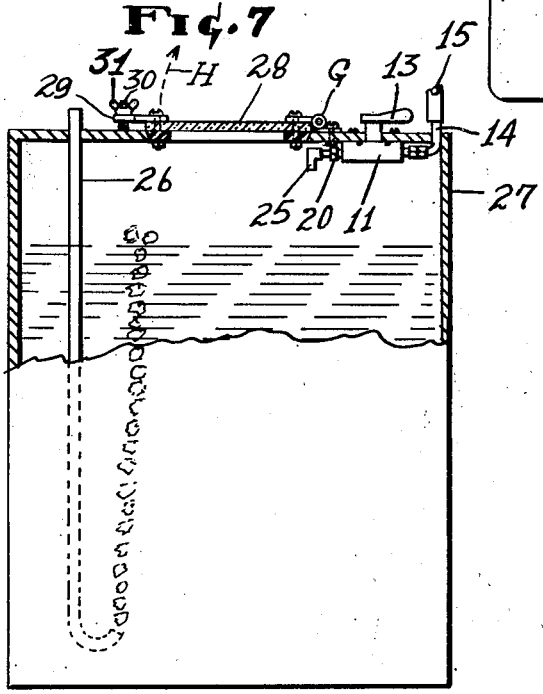

Patented Nov. 29, 1949

2,489,818

UNITED STATES PATENT OFFICE 2,489,818

WATER CARRIER FOR MINNOWS

Louis L. Roe, Wichita, Kans.

Application April 22, 1946, Serial No. 664,002

1 Claim. (Cl. 261—121)

This invention relates to a water carrier for minnows, and has for its principal object a means to aerate the water contained therein to maintain minnows alive as fishing bait.

A further object of this invention is to provide a control for the quantity of air required for best results for the minnows, and means to observe the quantity and regularity of air bubbling through the water to avoid excess agitation thereof.

A still further object of this invention is to supply the water in the container with air through the medium of a tube having a means to couple the same with a vehicle's windshield wiper suction tube, whereby a vacuum is created in the minnow container to aerate the water.

A still further object of this invention is to construct a minnow carrying portable device comprised of two containers, one of which is inserted within the other as partial sealing means for water carried thereby, the outer container being provided with a bail to carry the device, and suitably seated in a motor vehicle for transporting the device.

These and other objects will hereinafter be more fully explained, reference being had to the accompanying drawings forming a part of this specification, and in which like characters will apply to like parts in the different views.

Referring to the drawings:

Fig. 1 is a side view of the carrier, parts broken away for convenience of illustration.

Fig. 2 is a top plan view of Fig. 1.

Fig. 3 is an enlarged sectional view longitudinally of Fig. 1.

Fig. 4 is a further enlarged view partly in section taken on line 4—4 in Fig. 3, looking in direction of the arrows.

Fig. 5 is a sectional view taken on line 5—5 in Fig. 1.

Fig. 6 is a modification of the invention, and being partly in section.

Fig. 7 is another modification partly in section.

The carrier herein disclosed consists of an outer container 1, having an open top and a head 2 to close the bottom, and a bail 3 to carry the same, and another container 4 axially positioned in the first said container and being guided by a flaring portion A adjacent the bottom thereof to maintain its axial position and space its side wall from that of the first said container. It will be understood that the bottom of last said container is open as shown in Fig. 3, while its flaring rim seats on the bottom of the first said container. The upper end of the inner container is closed by a head 5 that is straight aligned thereacross and having a transparent jar 6 axially positioned thereon and upwardly extending, and an annular internally threaded rim 7 in which the jar threadedly engages and is made watertight by a gasket 8 on which the open end of the jar seats, said annular rim being secured watertight to the head.

Adjacent one side of the head 5 is connected a hollow vent tube 9 that has a rubber cap 10 to close the outer end of the tube, said tube, when its cap is removed, is means to avoid compression and vacuum as its container is submerged or withdrawn from the water, respectively, it being understood that live minnows for fishing bait are placed in the water while the flared rim is a further means to avoid escape of the minnows outward into the space between the walls of said containers at the time of inserting the inner container.

Secured to the underside of the head 5 is a hollow valve body portion 11, said portion at its longitudinal center having a slotted core 12 to function as a cut-off and supply through the body portion of the valve, said core having a handle 13 outwardly positioned to turn the core for the purpose of adjustably controlling the amount of air circulation. It will be seen in Figs. 5 and 6 that one end of the body portion has one end of a tube 14 secured thereto, while the other end extends upward and outward to form a nipple on which is removably positioned a rubber tube 15 that extends horizontally therefrom and having its other end secured to a T-coupling as at B. The other ends of the T-coupling as at C are insertable within a rubber tube 16 that is severed to receive the T-coupling, last said tube being a flexible coupling between the manifold and windshield wiper mechanism of the vehicle whereby the result of a vacuum is arranged for the carrier, the suction being conducted through a tube 17 having one of its ends connected to the body portion of the valve, and from thence extending upward into the jar and terminating a spaced distance from the bottom of the jar which is inverted as shown in Fig. 3. Said jar is partially filled with water to avoid submerging said upper end of the tube whereby a vacuum is provided within the empty portion D of the jar which in turn will transmit suction from the empty portion E of the container through the medium of a U-shaped tube 18 positioned in the jar. One leg of the U-shaped tube communicates with the inner container above its water line, while the other leg terminates within the jar and being submerged by the water therein, and the crotch may extend upward from the water line or be submerged as desired, slightly, by which means air from the inner container above its water line may be drawn through the U-shaped tube and discharged at the open lower end of the submerged leg, resulting in bubbled ascension upward along said submerged leg which action is a telltale for air drawn through water concealed in the inner container, the air being induced through apertures 19 that extend through the wall of said inner container, said apertures being of greater diameter than that of the upper apertures and may not be engaged by the injection of air as the small apertures may supply the requirement for plurally aligned bubbles passing upward through the water. It will be understood that the vacuum above the water line is sufficient to lower the water between the walls of the containers, whereby the smaller apertures will communicate with the space between the said walls for their supply of air, but in emergency a greater vacuum may lower the water to the apertures of the greater diameter. The above described condition was taken from a model and proved to work as specified.

It will be seen in Fig. 4 that a ball-valve 20 is arranged at the intake end of the valve body portion 11, the ball 21 of the valve being actuated by a spring 22 for normal closing, but free to release at the time of pumping a vacuum so that the air will pass thereby as drawn from the vacuum chamber D formed at the upper end of the glass jar, which in turn under vacuum strain will communicate with vacuum chamber E of the inner container through the medium of the U-shaped tube 18, one leg of which extends into last said vacuum chamber, while the other leg is submerged by water so that its lower extremity is positioned adjacent the lower portion of the jar whereby under vacuum strain bubbles will arise along the submerged leg to relieve the vacuum strain at the upper extremity of the jar, for the purpose heretofore described. The ball valve is free to close automatically at intervals of low suction, which varies according to speed or force of power by the engine of the vehicle, and it will also be seen that the pipe system may be discontinued by the core of the valve body 11, and this instance may occur when the fish bait carrier is removed. Furthermore the ball valve 50 will serve as a closing means for the suction pipe system of the carrier when its service is discontinued by stoppage of the vehicle engine, at which time should the other valve 11 be open, the charge of the water in the glass jar may be retained from returning into the inner container.

It will be seen in Figs. 6 and 7 that the containers are modified to eliminate the use of the glass jar, heretofore described, said containers being arranged to introduce air into the water as shown in said figure views. The container 23 in Fig. 6 may be similar to a transparent glass fruit jar having a cup 24 threaded to threadedly engage on the neck of the glass jar. The head of the cap is flat and has on its underside a similar valve arrangement as heretofore described, it being seen that one end of the valve body has a turned down nipple 25 as means to communicate with the vacuum space in the jar for a similar purpose, the other end of the valve body having a similar tube connection and T-coupling to connect the same with the suction pipe of the automobile engine, the bubble system for the introduction of fresh air being through the medium of a pipe 26 extending outward through the cap while the other portion of the pipe extends downward to near the bottom of the jar and having a return bend as an exhaust for the air upward through the water.

Fig. 7 is a further modification, wherein a container 27 has one end thereof to partially close the same and having an opening at its axial center, said opening being closed by a disc-like lid 28 that is transparent and preferably made from plastic material, said lid being hingedly connected as at G and adapted to open as indicated by dotted line H, said lid having on its peripheral edge diametrically opposite to its hinge a bifurcated member 29 secured to the top of the lid so that its legs will extend outward to straddle a threaded stud 30, the lid being secured to a closed position by a wing nut 31 engaging on the stud. Between the side wall of the container and peripheral edge of the opening is a similar valve arranged to that described in Fig. 6 and being on the underside of said container's end, the air induction tube is likewise the same as shown and positioned in the glass jar and for the same purpose when connected to the vehicle suction pipe system as above stated for Fig. 6. The transparent lid is a visual means to examine the bubble system as to its efficiency, while the body of the container is opaque and being made from any suitable material, it being understood that the body of the jar shown in Fig. 6 is transparent through which the air supply may be examined while being actuated under the vacuum strain to ascertain a predetermined quantity amount of air that is controlled by the valve arrangement, and such other modifications may be made as lie within the scope of the appended claim.

Having fully described my invention what I claim as new and desire to secure by Letters Patent is:

In a water carrier for minnows comprising an outer container, and an inner container positioned within the outer container and being of lesser diameter to provide an annular space between said container walls, the outer container being open at its upper end, the inner container being open at its lower end and having an upper head, the wall of the inner container being apertured adjacent its lower end, an annular internally threaded rim integrally joined to the outer side of the upper head of the inner container, a transparent jar open at one end and threaded externally at said end to threadedly engage in the rim positioning the open end of the jar downwardly, a hollow vent tube in said upper head and a cap therefor, a cut-off valve carried by the said head inwardly thereof and being controllable externally of said inner container, a pair of tubes connected to said valve, one tube extending through said head, the other tube extending through said head and into the jar and terminating in close relation to the upper end of said jar, a rubber hose connecting an outwardly extending portion of first said tube and being connected to an air suction supply, a U-shaped tube in said jar having its crotch upwardly positioned, the legs of last said tube extending downwardly, one leg terminating in close proximity with the head of said inner container, the other leg extending through said head and being carried thereby, the said jar and inner container being partially filled with water and by air suction as controlled by the valve fresh air will be drawn from the annular space through the inner container and from thence through the jar causing a bubbling action in said container and jar, the jar being an indicator to determine the quantity of air circulation in said inner container and being controllable by the valve.

LOUIS L. ROE.

REFERENCES CITED

The following references are of record in the file of this patent:

UNITED STATES PATENTS

| Number | Name | Date |
|---|---|---|
| 1,794,842 | Foster | Mar. 3, 1931 |
| 1,974,843 | Blashfield | Sept. 25, 1934 |
| 2,233,564 | West | Mar. 4, 1941 |
| 2,341,246 | Stowe | Feb. 8, 1944 |